United States Patent
Magri et al.

(10) Patent No.: US 9,253,514 B2
(45) Date of Patent: Feb. 2, 2016

(54) REQUESTS FOR EMERGENCY SERVICES THROUGH AN IPTV NETWORK

(71) Applicant: Alcatel-Lucent USA Inc., Murray Hill, NJ (US)

(72) Inventors: Marcus P. Magri, Frisco, TX (US); Gerardo M. Espinosa, Plano, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/951,129

(22) Filed: Jul. 25, 2013

(65) Prior Publication Data

US 2015/0033274 A1   Jan. 29, 2015

(51) Int. Cl.
*H04N 7/10* (2006.01)
*H04N 21/235* (2011.01)
*H04N 21/81* (2011.01)
*H04N 21/254* (2011.01)
*H04N 21/239* (2011.01)
*H04N 21/237* (2011.01)
*H04L 12/58* (2006.01)
*H04L 29/06* (2006.01)

(52) U.S. Cl.
CPC ............ *H04N 21/235* (2013.01); *H04L 51/046* (2013.01); *H04L 65/4015* (2013.01); *H04N 21/237* (2013.01); *H04N 21/2393* (2013.01); *H04N 21/254* (2013.01); *H04N 21/814* (2013.01)

(58) Field of Classification Search
CPC .................................................... H04N 21/814
USPC ........................................................ 725/33, 34
See application file for complete search history.

(56) References Cited

U.S. PATENT DOCUMENTS

| | | |
|---|---|---|
| 2010/0251325 A1 | 9/2010 | Gupta |
| 2010/0319021 A1* | 12/2010 | Emerson et al. ................ 725/33 |
| 2013/0212165 A1* | 8/2013 | Vermeulen et al. ........... 709/203 |
| 2014/0006525 A1* | 1/2014 | Freund et al. ................ 709/206 |

OTHER PUBLICATIONS

Text-to-911-consumer-guide downloaded on Jul. 25, 2013 from http://www.fcc.gov/text-to-911.

* cited by examiner

*Primary Examiner* — Nasser Goodarzi
*Assistant Examiner* — Michael Hong
(74) *Attorney, Agent, or Firm* — Duft Bornsen & Fettig, LLP

(57) ABSTRACT

Systems and methods that request emergency services through an Internet-Protocol Television (IPTV) infrastructure. One embodiment comprises an IPTV network infrastructure comprising an IPTV server coupled to an IPTV set-top box of an end user that subscribes to IPTV services. The IPTV server receives a request for an emergency service from the end user through the IPTV set-top box. The infrastructure further includes a management server that receives the request for the emergency service from the IPTV server, and identifies information regarding the end user from an IPTV account of the end user. The infrastructure further includes a text message engine that receives the request for the emergency service from the management server, formats a text message for requesting the emergency service, inserts the information regarding the end user in the text message, and sends the text message to an emergency services center.

12 Claims, 4 Drawing Sheets

REQUESTS FOR EMERGENCY SERVICES THROUGH AN IPTV NETWORK

FIELD OF THE INVENTION

The invention is related to the field of communication systems and, in particular, to IPTV system technology.

BACKGROUND

Internet Protocol Television (IPTV) is a service through which television and other video content is delivered to an end user over a packet-switched network, such as the internet. An IPTV subscriber connects to an IPTV network in a similar way that a cable subscriber connects to a cable network. The IPTV subscriber receives a set-top box (STB) from the IPTV provider, and the set-top box connects to the IPTV backend over a packet-switched network. The physical connection between the IPTV backend and the set-top box, for example, may be a Digital Subscriber Line (xDSL), fiber, Ethernet, etc. One or more servers within the IPTV backend then provide the television content to the set-top box for viewing over the subscriber's television or other suitable display. The IPTV subscriber can view an Electronic Programming Guide (EPG) displayed by the set-top box, and select programs or videos to watch.

IPTV providers maintain a committed Quality of Service (QoS) for the IPTV service so that the content being viewed by a subscriber is not interrupted. IPTV providers are competing with cable, Internet over-the-top (OTT), and satellite providers, so they want subscribers to have a high-quality viewing experience. Therefore, the IPTV network is a "closed" network that is specifically designed to deliver IPTV content.

SUMMARY

Embodiments described herein trigger emergency services through an IPTV network. An end user (i.e., an IPTV subscriber) is able to request emergency services, such as 9-1-1 services, through an IPTV set-top box. For example, the end user may press a pre-assigned button on a remote control of the IPTV set-top box. The set-top box then forwards a request for an emergency service to an IPTV backend subsystem. Servers within the IPTV backend subsystem and Operations Support Systems (OSS) then contact an emergency services center, such as a 9-1-1 center, to dispatch emergency services to the location of the end user.

These embodiments advantageously provide an alternative way for an IPTV subscriber to contact emergency services. If the IPTV subscriber is not able to reach his/her phone to call emergency services or is otherwise incapacitated, then the IPTV subscriber can simply press a button on his/her remote control to request the needed services.

One embodiment comprises an Internet-Protocol Television (IPTV) network infrastructure. The infrastructure includes an IPTV server coupled to an IPTV set-top box of an end user that subscribes to IPTV services. The IPTV server is configured to receive a request for an emergency service from the end user through the IPTV set-top box. The infrastructure further includes a management server configured to receive the request for the emergency service from the IPTV server, and to identify information regarding the end user from an IPTV account of the end user. The infrastructure further includes a text message engine configured to receive the request for the emergency service from the management server, to format a text message for requesting the emergency service, to insert the information regarding the end user in the text message, and to send the text message to an emergency services center.

In one embodiment, the text message comprises a Short Messaging Services (SMS) message.

In one embodiment, the text message indicates the emergency service requested by the end user, such as fire, ambulance, or police.

In one embodiment, the information regarding the end user includes a name, an address, and a phone number for the end user.

In one embodiment, the request for the emergency service comprises a web service call, such as a Hypertext Transfer Protocol (HTTP) call. The web service call may include a parameter for the emergency service requested by the end user. The web service call may also include a parameter for an IP address associated with the IPTV set-top box of the end user. Thus, the management server may be configured to identify the IPTV account for the end user based on the IP address associated with the IPTV set-top box.

In one embodiment, the management server resides in an Operations Support System (OSS) of a telecommunications provider.

In one embodiment, the emergency services center comprises a Public Safety Answering Point (PSAP).

Another embodiment comprises a method of requesting emergency services through an IPTV network infrastructure. The method includes receiving, at an IPTV server, a request for an emergency service from an IPTV set-top box of an end user that subscribes to IPTV services. The method further includes forwarding the request for the emergency service from the IPTV server to a management server. The method further includes identifying, in the management server, information regarding the end user from an IPTV account of the end user. The method further includes forwarding the request for the emergency service from the management server to a text message engine. The method further includes formatting a text message in the text message engine for requesting the emergency service, inserting the information regarding the end user in the text message, and sending the text message from the text message engine to an emergency services center.

Another embodiment comprises an IPTV network infrastructure comprising an IPTV server coupled to an IPTV set-top box of an end user that subscribes to IPTV services. The IPTV server is configured to receive a web service call requesting an emergency service from the IPTV set-top box. The infrastructure further includes a management server configured to receive the web service call from the IPTV server, and to identify information regarding the end user from an IPTV account of the end user. The infrastructure further includes a text message engine configured to receive the web service call from the management server, to format a text message for requesting the emergency service, to insert the information regarding the end user in the text message, and to send the text message to an emergency services center.

Other exemplary embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
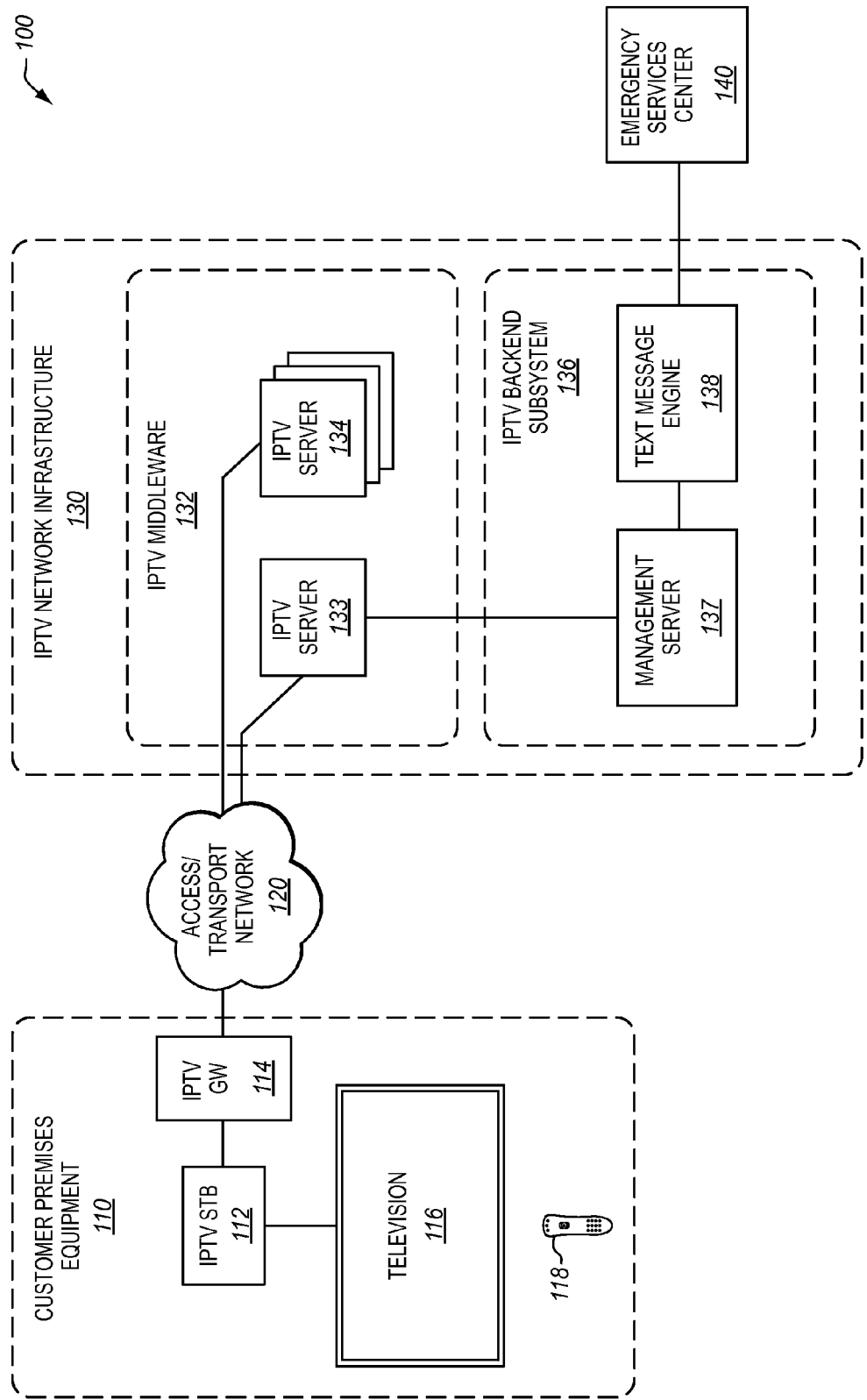
FIG. 1 illustrates a communication network for IPTV services in an exemplary embodiment.

FIG. 1 illustrates a communication network 100 for IPTV services in an exemplary embodiment. Because network 100 provides IPTV services, it may be generally referred to as an IPTV network. One assumption for FIG. 1 is that an end user subscribes to IPTV services, and has an IPTV account with an IPTV service provider that utilizes network 100. The end user is able to access the IPTV services through customer premises equipment 110. The IPTV services are provided to the end user by IPTV network infrastructure 130 over access/transport network 120.

Network 100 is enhanced in the following embodiment to provide functionalities where the end user is able to request emergency services (e.g., 9-1-1 services) over network 100. In FIG. 1, customer premises equipment 110 includes an IPTV set-top box (STB) 112 and an IP-TV gateway (GW) 114 (e.g., a residential gateway). IPTV set-top box 112 comprises a component or device that receives signals or a flow of data that includes IP-TV content (e.g., television, on-demand video, EPG, etc.) from an external source, and converts the signals or data flow into a format so that the IPTV content can be displayed on a television or other suitable display. In this embodiment, IPTV set-top box 112 is connected to a television 116 at the customer premises equipment 110. IPTV gateway 114 comprises a component or device that provides connectivity to an access network or access link that delivers the IPTV content to customer premises equipment 110 for the IPTV service.

IPTV set-top box 112 is enhanced in this embodiment to recognize a request for emergency services initiated by the end user. For example, the end user may press a button on a remote control 118 to initiate a request for emergency services. IPTV set-top box 112 then forwards the request for emergency services to IPTV network infrastructure 130 for further processing. The operation of IPTV set-top box 112 is described in further detail below.

Network 120 is referred to as "access/transport" in FIG. 1 because it represents both an access network to customer premises equipment 110, and a transport network for the IPTV content. For example, the access network in this embodiment may be DSL, fiber, Ethernet, etc. The transport network in this embodiment is a packet-switched (PS) or label-switched (MPLS) network that typically uses IP as a (network layer) protocol.

IPTV network infrastructure 130 includes components representing IPTV middleware 132 and an IPTV backend subsystem 136. IPTV middleware 132 includes a plurality of IPTV servers 133-134. IPTV servers 134 are nodes in the infrastructure that deliver IPTV content to customer premises equipment 110 (and other IPTV customers). IPTV servers 134 may store the actual IPTV content and deliver the content to customer premises equipment 110, or may access other content servers and assist in delivering the content to customer premises equipment 110. In this embodiment, IPTV server 133 includes specialized components or applications to handle requests for emergency services from the end user, which is described in further detail below in FIG. 4. IPTV server 133 may operate in a similar manner as IPTV servers 134 to deliver IPTV content to customer premises equipment 110, or may be a dedicated server for handling requests for emergency services.

IPTV backend subsystem 136 includes a management server 137 and a text message engine 138. Management server 137 comprises a component or device that maintains information regarding IPTV subscriptions for end users (i.e., customers). For example, management server 137 may store a subscriber profile for each of its customers that includes a name, an address, and a phone number of the customer, a level of service or subscription plan for the customer, etc. Text message engine 138 comprises a component or device that is operable to format a text message that requests emergency services. A text message as referred to herein may comprise a Short Messaging Service (SMS) message or a Multimedia Messaging Service (MMS) message.

IPTV backend subsystem 136 may be implemented on the same platform as IPTV servers 133-134. Alternatively, IPTV backend subsystem 136 may be on an external platform. For example, some IPTV service providers are part of, or contract with, a telecommunications provider. In these scenarios, the IPTV backend subsystem 136 may be part of an Operations Support System (OSS) of a telecommunications provider. For example, one or both of management server 137 and text message engine 138 may be part of the OSS of a telecommunications provider.

Also illustrated in FIG. 1 is an emergency services center 140. Emergency services center 140 represents any type of equipment that is used to dispatch emergency services. For example, emergency services center 140 may represent a Public Safety Answering Point (PSAP), which is a call center that answers emergency calls, such as 9-1-1 calls. In this embodiment, emergency services center 140 is equipped with functionality to receive and process text messages.

Assume for the following embodiment that the end user encounters a situation where emergency services are needed. For example, there may be a fire at the end user's home, or the end user may have a medical emergency. Typically, the end user would pick up his/her phone and call a dedicated number for emergency services, such as 9-1-1 in the United States, or 1-1-2 in Europe. However, if the end user is not able to reach a phone, the end user is able to summon emergency services through the IPTV network.

Figure 2:
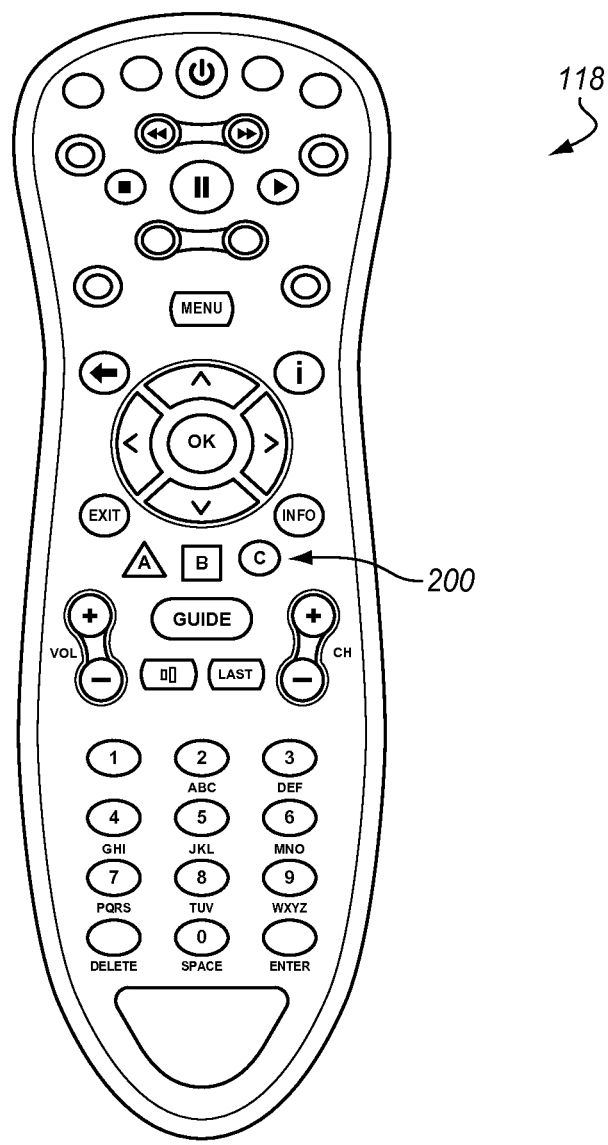
FIG. 2 illustrates a remote control for an IPTV set-top box in an exemplary embodiment.

FIG. 2 illustrates a remote control 118 for IPTV set-top box 112 in an exemplary embodiment. To summon emergency services, the end user can press a button on remote control 118. One or more buttons on remote control 118 may be designated for emergency services, such as button 200. When the end user presses button 200 on remote control 118, remote control 118 will send a signal to IPTV set-top box 112. IP-TV set-top box 112 in turn will process the signal from remote control 118 and interpret the signal as a request for an emergency service.

Figure 3:
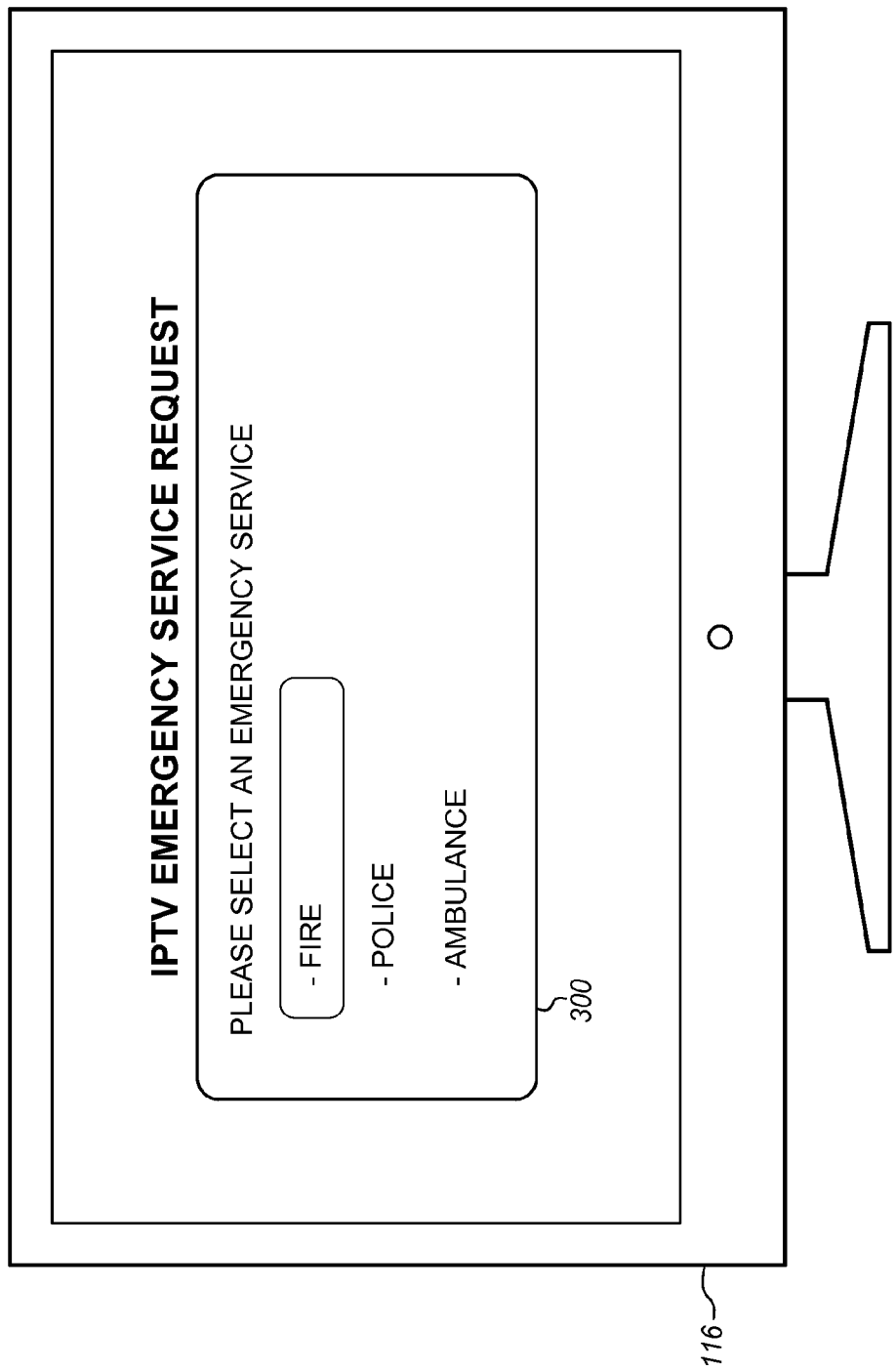
FIG. 3 illustrates a menu displayed to an end user by an IPTV set-top box in an exemplary embodiment.

The signal from remote control 118 may indicate a type of emergency service requested by the end user. For example, there may be a dedicated button for "fire", "police", and "ambulance" on remote control 118. Alternatively, IPTV set-top box 112 may query the end user to select a type of emergency service that is requested. FIG. 3 illustrates a menu displayed to the end user by IPTV set-top box 112 in an exemplary embodiment. IPTV set-top box 112 displays a menu 300 on television 116 with options for emergency services, such as "fire", "police", and "ambulance". The end user can then use remote control 118 to select the desired emergency service from menu 300.

After the end user presses the appropriate button on remote control 118, IPTV set-top box 112 forwards a request for an emergency service to IPTV network infrastructure 130 (through IPTV gateway 114 and access/transport network 120). IPTV network infrastructure 130 then operates to deliver the request for the emergency service to emergency services center 140. This operation is illustrated in FIG. 4.

Figure 4:
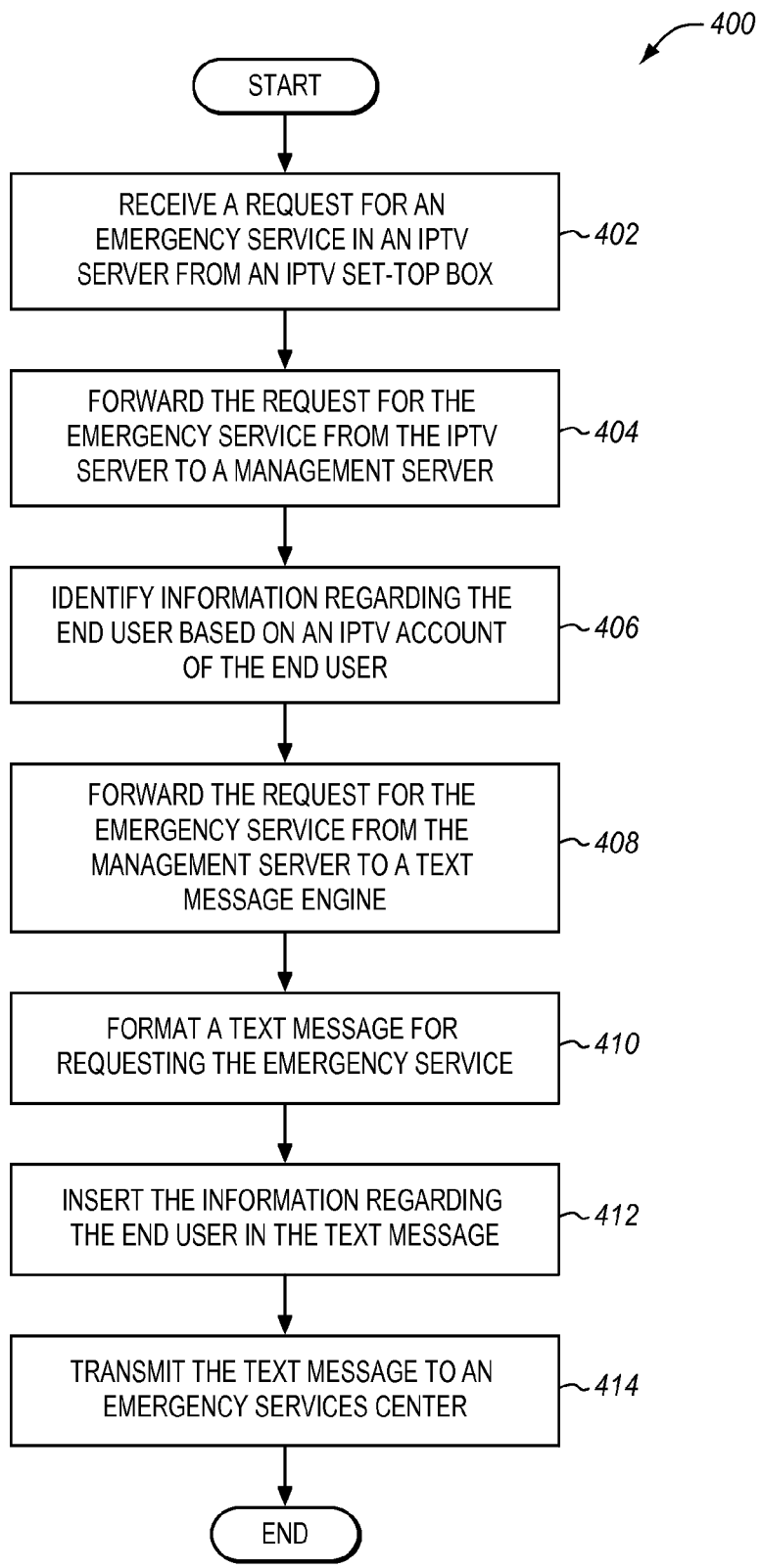
FIG. 4 is a flow chart illustrating a method for requesting emergency services through an IPTV network in an exemplary embodiment.

FIG. 4 is a flow chart illustrating a method 400 for requesting emergency services through an IPTV network in an exemplary embodiment. The steps of method 400 will be described with reference to IPTV network infrastructure 130 in FIG. 1, but those skilled in the art will appreciate that method 400 may be performed in other systems. Also, the steps of the flow charts described herein are not all inclusive and may include other steps not shown, and the steps may be performed in an alternative order.

In step 402, IPTV server 133 receives the request for the emergency service that was sent from IPTV set-top box 112. The request for the emergency service may be in any suitable format that is understood by IPTV server 133. In one embodiment, the request for the emergency service may be in the form of a web service call (or function call) for an emergency service, which is a request for a particular web service. For example, the web service call may be:

(http://<<Service_Provider>>/EmergencyCallWS/EmergencyCall.html).

This web service call may include parameters, such as an identifier for IPTV set-top box 112 (e.g., a Global Unique Identifier Number (GUID)), an IP address assigned to customer premises equipment 110 (e.g., an IP address associated with IPTV set-top box/IP-TV gateway 114), and the emergency services option selected by the end user (e.g., fire, police, or ambulance). Although HTTP is used for the web service call is this example, the web service call may be in another protocol, such as SOAP, ParlayX, REST, OneAPI, etc.

In step 404, IPTV server 133 forwards the request for the emergency service to management server 137. In forwarding the request, IPTV server 133 may format and transmit the same or another web service call as described above. Thus, the request for the emergency service sent from IPTV server 133 may include the same parameters as described above.

In response to receiving the request from IPTV server 133, management server 137 identifies information regarding the end user based on an IPTV account of the end user in step 406. For example, management server 137 may identify an IPTV account (or subscriber profile) for the end user based on the identifier (e.g., IP address assigned to the subscriber's home router (residential gateway) during the DHCP process) for IPTV set-top box 112 that was included in the request for emergency services. Management server 137 may then process the subscriber profile to identify, through the IP address and access port, the name associated with the IPTV account, the address associated with the IPTV account, the phone number associated with the IPTV account, and other information. As stated above, management server 137 may be part of an OSS of a telecommunications provider. Thus, management server 137 may have access to an Order Management System (OMS), a Customer Relations Management (CRM) system, and/or a Billing Business Support System (BSS) to access information regarding the end user.

In step 408, management server 137 forwards the request for the emergency service to text message engine 138 with the information regarding the end user. To do so, management server 137 may format and transmit a web service call to text message engine 138, such as an HTTP web service call, a SOAP web service call, etc. The web service call may include the name, address, and phone number associated with the end user, along with the other parameters, such as the option for emergency services selected by the end user, such as fire, police, or ambulance.

In response to the request from management server 137, text message engine 138 formats a text message for requesting the emergency service in step 410. Text message engine 138 then inserts the information regarding the end user in the text message in step 412. For example, text message engine 138 may insert the name, address, and phone number associated with the end user into the text message. Text message engine 138 may also insert an indicator of a specific type of emergency service as requested by the end user, such as fire, police, or ambulance. Text message engine 138 may insert any other desired information in the text message to summon the emergency service desired by the end user.

Text message engine 138 then transmits the text message to emergency services center 140 in step 414. In response to the text message, emergency services center 140 will dispatch fire, police, or ambulance services based on the request from the end user.

The network 100 described above advantageously gives the end user another option for requesting emergency services. If the end user is not able to place a phone call to 9-1-1, then the end user has the option to summon emergency services through the IPTV network and get the needed assistance.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
an Internet-Protocol Television (IPTV) network infrastructure comprising:
an IPTV server coupled to an IPTV set-top box of an end user that subscribes to IPTV services, wherein the IPTV server is configured to receive a web service call for an emergency service requested by the end user through the IPTV set-top box, wherein the web service call includes a first parameter indicating the emergency service requested by the end user, and a second parameter indicating an IP address associated with the IPTV set-top box of the end user;
a management server configured to receive the web service call from the IPTV server, to identify an IPTV account for the end user based on the IP address included in the second parameter of the web service call, to identify information regarding the end user from the IPTV account, and to insert the information regarding the end user in a third parameter of the web service call; and
a text message engine configured to receive the web service call from the management server, to format a text message in response to the web service call, to insert the information regarding the end user in the text message as provided in the third parameter of the web service call, to insert an indication of the emergency service requested by the end user in the text message as provided in the first parameter of the web service call, and to send the text message to an emergency services center.

2. The apparatus of claim 1 wherein:
the text message comprises a Short Messaging Services (SMS) message.

3. The apparatus of claim 1 wherein:
the information regarding the end user includes a name, an address, and a phone number for the end user.

4. The apparatus of claim 1 wherein:
the web service call is in Hypertext Transfer Protocol (HTTP).

5. The apparatus of claim 1 wherein:
the management server resides in an Operations Support System (OSS) of a telecommunications provider.

6. The apparatus of claim 1 wherein:
the emergency services center comprises a Public Safety Answering Point (PSAP).

7. A method of requesting emergency services through an Internet-Protocol Television (IPTV) network infrastructure, the method comprising:
receiving, at an IPTV server, a web service call from an IPTV set-top box of an end user that subscribes to IPTV services, wherein the web service call includes a first parameter indicating an emergency service requested by the end user, and a second parameter indicating an IP address associated with the IPTV set-top box of the end user;
forwarding the web service call from the IPTV server to a management server;
identifying, at the management server, an IPTV account for the end user based on the IP address included in the second parameter of the web service call;
identifying, at the management server, information regarding the end user from the IPTV account;
inserting, at the management server, the information regarding the end user in a third parameter of the web service call;
forwarding the web service call from the management server to a text message engine;
formatting, at the text message engine, a text message in response to the web service call;
inserting, at the text message engine, the information regarding the end user in the text message as provided in the third parameter of the web service call;
inserting, at the text message engine, an indication of the emergency service requested by the end user in the text message as provided in the first parameter of the web service call; and
sending the text message from the text message engine to an emergency services center.

8. The method of claim 7 wherein:
the text message comprises a Short Messaging Services (SMS) message.

9. The method of claim 7 wherein:
the information regarding the end user includes a name, an address, and a phone number for the end user.

10. The method of claim 7 wherein:
the web service call is in Hypertext Transfer Protocol (HTTP).

11. The method of claim 7 wherein:
the emergency services center comprises a Public Safety Answering Point (PSAP).

12. An apparatus comprising:
an Internet-Protocol Television (IPTV) network infrastructure comprising:
an IPTV server coupled to an IPTV set-top box of an end user that subscribes to IPTV services, wherein the IPTV server is configured to receive a web service call requesting an emergency service from the IPTV set-top box, wherein the web service call includes a first parameter indicating the emergency service requested by the end user, and a second parameter indicating an IP address associated with the IPTV set-top box of the end user;
a management server configured to receive the web service call from the IPTV server, to identify an IPTV account for the end user based on the IP address included in the second parameter of the web service call, to identify an address of the end user from the IPTV account, and to insert the address of the end user in a third parameter of the web service call; and
a text message engine configured to receive the web service call from the management server, to format a text message in response to the web service call, to insert the information regarding address of the end user in the text message as provided in the third parameter of the web service call, to insert an indication of the emergency service requested by the end user in the text message as provided in the first parameter of the web service call, and to send the text message to an emergency services center.

* * * * *